(12) United States Patent
Hanazaki et al.

(10) Patent No.: US 10,897,047 B2
(45) Date of Patent: Jan. 19, 2021

(54) NON-AQUEOUS ELECTROLYTE SECONDARY BATTERY AND METHOD OF PRODUCING THE SAME (71) Applicant: TOYOTA JIDOSHA KABUSHIKI KAISHA, Toyota (JP)

(72) Inventors: Ryo Hanazaki, Toyota (JP); Akihiro Ochiai, Toyonaka (JP); Yusuke Fukumoto, Toyonaka (JP); Harunari Shimamura, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/110,681

(22) Filed: Aug. 23, 2018

(65) Prior Publication Data
US 2019/0088951 A1  Mar. 21, 2019

(30) Foreign Application Priority Data

Sep. 15, 2017 (JP) ................................ 2017-177915

(51) Int. Cl.
| *H01M 4/66* | (2006.01) |
| *H01M 4/36* | (2006.01) |
| *H01M 4/62* | (2006.01) |
| *H01M 4/04* | (2006.01) |
| *H01M 10/0525* | (2010.01) |

(52) U.S. Cl.
CPC .......... *H01M 4/667* (2013.01); *H01M 4/043* (2013.01); *H01M 4/366* (2013.01); *H01M 4/624* (2013.01); *H01M 4/668* (2013.01); *H01M 4/0404* (2013.01); *H01M 10/0525* (2013.01)

(58) Field of Classification Search
None
See application file for complete search history.

(56) References Cited

U.S. PATENT DOCUMENTS

2008/0292965 A1* 11/2008 Kubota ............. H01M 10/0525
429/246
2016/0093922 A1   3/2016 Endo et al.

FOREIGN PATENT DOCUMENTS

| JP | 2009-004360 A | 1/2009 |
| JP | 2016-072221 A | 5/2016 |

* cited by examiner

*Primary Examiner* — Carmen V Lyles-Irving
(74) *Attorney, Agent, or Firm* — Oliff PLC (57) ABSTRACT

A non-aqueous electrolyte secondary battery includes at least an electrode composite material layer, an intermediate layer, and an electrode current collector. Intermediate layer is interposed between electrode composite material layer and electrode current collector. Intermediate layer contains at least insulating particles and conductive particles. Each insulating particle has an arc shape in a cross section of intermediate layer along a thickness direction. More conductive particles are present on an outer-circumference side of each arc shape than on an inner-circumference side of the arc shape.

7 Claims, 8 Drawing Sheets

NON-AQUEOUS ELECTROLYTE SECONDARY BATTERY AND METHOD OF PRODUCING THE SAME

This nonprovisional application is based on Japanese Patent Application No. 2017-177915 filed on Sep. 15, 2017 with the Japan Patent Office, the entire contents of which are hereby incorporated by reference.

BACKGROUND

Field

The present disclosure relates to a non-aqueous electrolyte secondary battery and a method of producing the same.

Description of the Background Art

Japanese Patent Laying-Open No. 2016-072221 discloses formation of an intermediate layer between an electrode composite material layer and an electrode current collector.

SUMMARY

Research has been conducted on formation of an intermediate layer interposed between an electrode composite material layer and an electrode current collector. For example, an intermediate layer that contains insulating particles and conductive particles is considered. The insulating particles may be ceramic particles, for example. The conductive particles may be carbon black particles, for example. Such an intermediate layer containing insulating particles and conductive particles is expected to have the action of inhibiting an increase of a short-circuit current at the time of an internal short circuit.

Generally, insulating particles are very hard. Therefore, it is difficult to form an intermediate layer having a high compression rate by using a typical compressing means (a roll press, for example). It is considered that within an intermediate layer having a low compression rate, the state of packing of insulating particles and conductive particles is likely to be uneven. It is then considered that when the state of packing is uneven, the intermediate layer has some regions in which a short-circuit current flows easily.

An object of the present disclosure is to inhibit an increase of a short-circuit current.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A non-aqueous electrolyte secondary battery includes at least an electrode composite material layer, an intermediate layer, and an electrode current collector. The intermediate layer is interposed between the electrode composite material layer and the electrode current collector. The intermediate layer contains at least insulating particles and conductive particles. Within a cross section of the intermediate layer along a thickness direction, each insulating particle has an arc shape. More conductive particles are present on an outer-circumference side of each arc shape than on an inner-circumference side of the arc shape.

Figure 1:
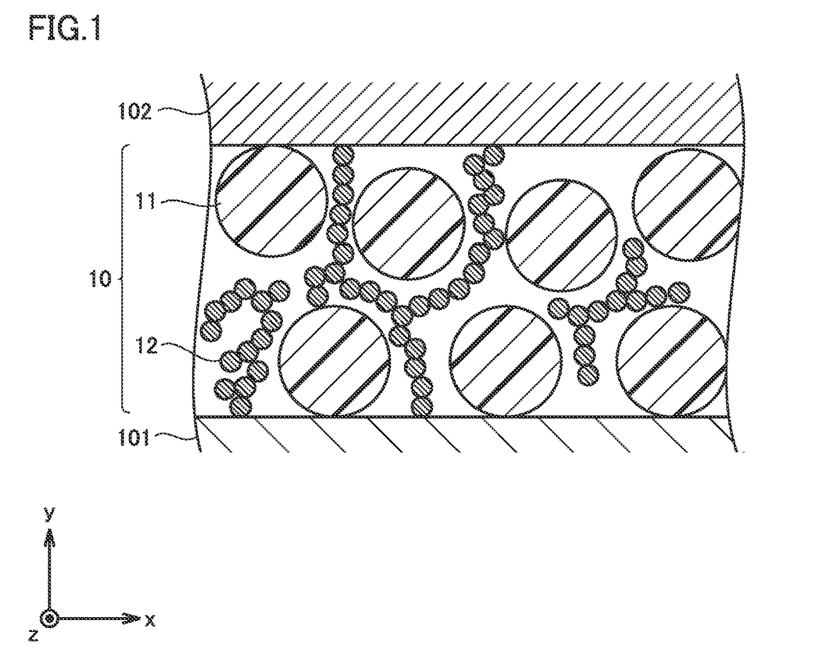
FIG. 1 is a first conceptual cross-sectional view that describes an action mechanism according to the present disclosure.

FIG. 1 is a first conceptual cross-sectional view that describes an action mechanism according to the present disclosure.

Each of FIGS. 1 to 4 shows a cross section of the intermediate layer along a thickness direction. FIG. 1 shows an intermediate layer 10 in its pre-compression state. Intermediate layer 10 is interposed between an electrode composite material layer 102 and an electrode current collector 101. Intermediate layer 10 contains solid particles 11 and conductive particles 12. Each solid particle 11 substantially does not have a cavity inside. Solid particles 11 are insulating particles.

Figure 2:
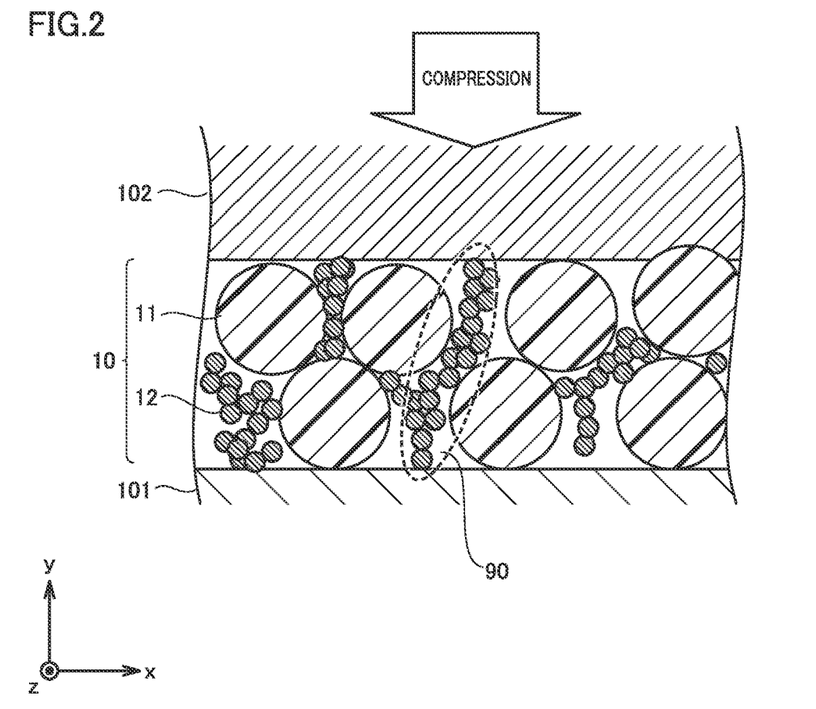
FIG. 2 is a second conceptual cross-sectional view that describes the action mechanism according to the present disclosure.

FIG. 2 is a second conceptual cross-sectional view that describes the action mechanism according to the present disclosure.

FIG. 2 shows intermediate layer 10 in its post-compression state. Because solid particles 11 (insulating particles) are hard, dense packing of intermediate layer 10 is unlikely to be obtained. It is considered that in a region where one solid particle 11 is widely spaced from another, a current pathway 90 with a low electrical resistance is formed between electrode composite material layer 102 and electrode current collector 101. It is also considered that at the time of an internal short circuit, short-circuit currents converge to current pathway 90 and then the electrical resistance of current pathway 90 becomes even lower. In other words, it is considered that the amount of short-circuit currents increases.

Figure 3:
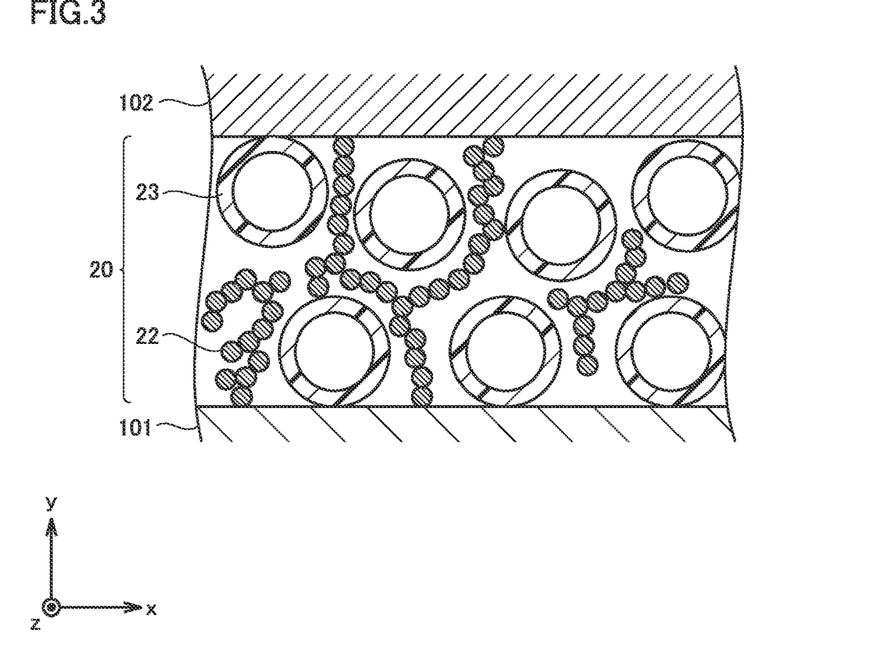
FIG. 3 is a third conceptual cross-sectional view that describes the action mechanism according to the present disclosure.

FIG. 3 is a third conceptual cross-sectional view that describes the action mechanism according to the present disclosure.

FIG. 3 shows an intermediate layer 20 in its pre-compression state. Intermediate layer 20 is interposed between electrode composite material layer 102 and electrode current collector 101. Intermediate layer 20 contains hollow particles 23 and conductive particles 22. Each hollow particle 23 has a cavity inside. Hollow particles 23 are insulating particles.

Figure 4:
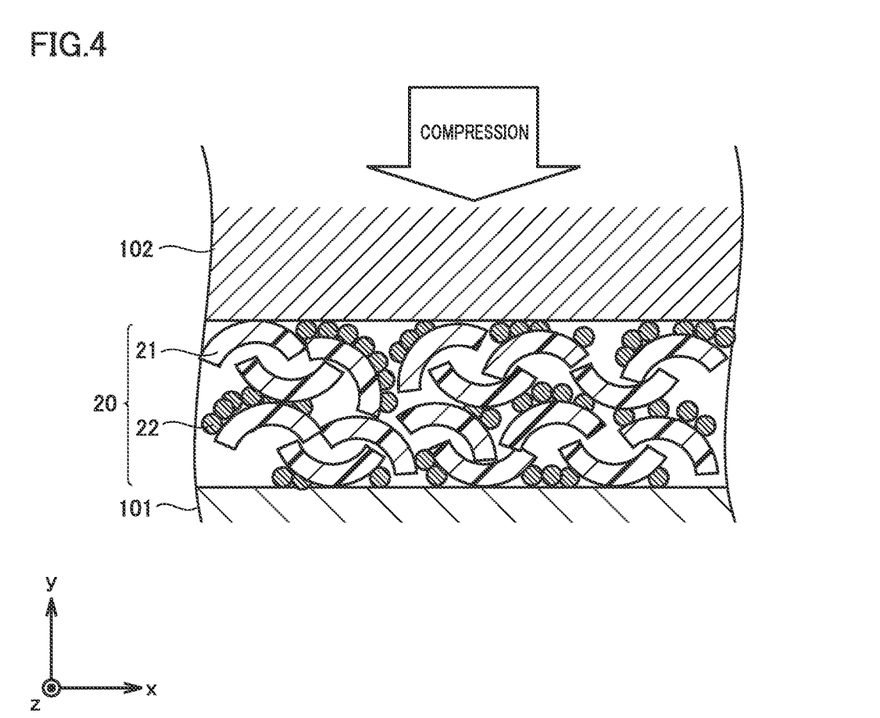
FIG. 4 is a fourth conceptual cross-sectional view that describes the action mechanism according to the present disclosure.

FIG. 4 is a fourth conceptual cross-sectional view that describes the action mechanism according to the present disclosure.

FIG. 4 shows intermediate layer 20 in its post-compression state. Compression causes breakage of hollow particles 23 (FIG. 3). It is considered that breakage of hollow particles 23 increases the compression rate of intermediate layer 20. Furthermore, breakage of hollow particles 23 causes formation of insulating particles 21. Each insulating particle 21 has an arc shape. More conductive particles 22 are present on an outer-circumference side of each arc shape than on an inner-circumference side of the arc shape. This phenomenon is attributed to the absence of conductive particles 22 inside hollow particles 23 before breakage.

Each insulating particle 21 has an arc shape and therefore is likely to be densely packed. For this reason, it is considered that uneven packing of insulating particles 21 and conductive particles 22 is unlikely to occur. Furthermore, it is expected that the biased distribution of conductive particles 22, namely a higher concentration of the conductive particles on the outer-circumference side of each insulating particle 21 inhibits formation of current pathway 90 with a low electrical resistance (FIG. 2). In other words, it is expected that an increase of a short-circuit current within intermediate layer 20 is inhibited.

[2] The arc shape includes an outer-circumference line and an inner-circumference line. A region with a width of 1 μm extending from the outer-circumference line in a direction away from the inner-circumference line is defined as an outer-circumference region. A region with a width of 1 μm extending from the inner-circumference line in a direction away from the outer-circumference line is defined as an inner-circumference region. The conductive particles have a first concentration in the outer-circumference region. The conductive particles have a second concentration in the inner-circumference region. The ratio of the first concentration to the second concentration is higher than 1.

Herein, the ratio of the first concentration to the second concentration is also called "degree of biased distribution". This degree of biased distribution may be used to check that more conductive particles are present on the outer-circumference side of each arc shape than on the inner-circumference side of the arc shape. It is considered that when the degree of biased distribution is higher than 1, more conductive particles are present on the outer-circumference side of each arc shape than on the inner-circumference side of the arc shape.

[3] The ratio of the first concentration to the second concentration may be not lower than 2 and not higher than 50. When the degree of biased distribution is not lower than 2 and not higher than 50, inhibition of an increase of a short-circuit current is expected to be obtained, for example.

[4] The outer-circumference line has a first radius of curvature. The inner-circumference line has a second radius of curvature. The ratio of the second radius of curvature to the first radius of curvature may be not lower than 0.3 and not higher than 0.95.

Herein, the ratio of the second radius of curvature to the first radius of curvature is also called "curvature radius ratio". When the curvature radius ratio is not lower than 0.3 and not higher than 0.95, inhibition of an increase of a short-circuit current is expected to be obtained, for example.

[5] The intermediate layer may have a porosity not lower than 5% and not higher than 30%. When the intermediate layer has a porosity within this range, inhibition of an increase of a short-circuit current is expected to be obtained. Furthermore, it is also expected that the resistance of the battery is low during normal use.

[6] The intermediate layer may contain the conductive particles in an amount not lower than 0.01 mass % and not higher than 5 mass %. When this amount is within this range, the resistance of the battery is expected to be low during, for example, normal use.

[7] A method of producing a non-aqueous electrolyte secondary battery includes at least the following steps ($\alpha$) to ($\gamma$):

($\alpha$) forming an intermediate layer on a surface of an electrode current collector;

($\beta$) forming an electrode composite material layer on a surface of the intermediate layer; and ($\gamma$) compressing the intermediate layer.

The intermediate layer is formed so as to contain at least hollow particles and conductive particles. Compression of the intermediate layer causes breakage of the hollow particles. Breakage of the hollow particles causes formation of insulating particles. Each insulating particle has an arc shape within a cross section of the intermediate layer along a thickness direction.

In the intermediate layer formed by the method described above, inhibition of an increase of a short-circuit current is expected to be obtained.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiments") are described. It should be noted that the following description does not limit the scope of claims.

As an example, a lithium-ion secondary battery is described below. It should be noted that a non-aqueous electrolyte secondary battery according to the present embodiment is not limited to a lithium-ion secondary battery. The non-aqueous electrolyte secondary battery according to the present embodiment may be a sodium-ion secondary battery, for example. In the description below, a non-aqueous electrolyte secondary battery may be abbreviated as "battery".

As an example, an embodiment in which an intermediate layer is interposed between a positive electrode composite material layer and a positive electrode current collector is described below. The present embodiment also subsumes an embodiment in which an intermediate layer is interposed between a negative electrode composite material layer and a negative electrode current collector. In other words, the intermediate layer according to the present embodiment is interposed between an electrode composite material layer and an electrode current collector.

<Non-Aqueous Electrolyte Secondary Battery>

Figure 5:
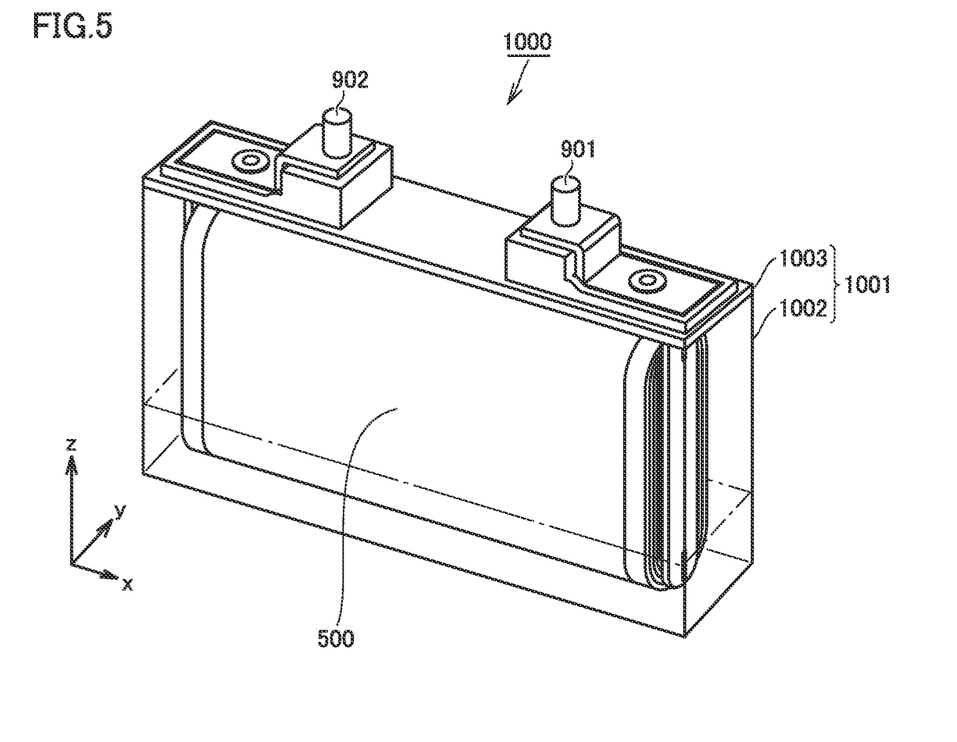
FIG. 5 is a schematic view illustrating the structure of a non-aqueous electrolyte secondary battery according to the present embodiment.

FIG. 5 is a schematic view illustrating the structure of the non-aqueous electrolyte secondary battery according to the present embodiment.

The outside shape of a battery 1000 is a flat, rectangular parallelepiped. In other words, battery 1000 has a prismatic shape. It should be noted that the battery according to the present embodiment is not limited to a battery having a prismatic shape. The battery according to the present embodiment may have a cylindrical shape, for example.

<<Casing>>

Battery 1000 includes a casing 1001. Casing 1001 is hermetically sealed. Casing 1001 may be made of aluminum (Al) alloy, for example. As long as being hermetically sealed, casing 1001 may be, for example, a pouch made of an Al-laminated film or the like. In other words, the battery according to the present embodiment may be a laminate-type battery.

Casing 1001 includes a container 1002 and a cap 1003. Cap 1003 is bonded to container 1002 by, for example, laser beam welding. Cap 1003 is equipped with a positive electrode terminal 901 and a negative electrode terminal 902. Cap 1003 may be further equipped with a liquid inlet, a gas-discharge valve, and a current interrupt device (CID), for example.

Casing 1001 accommodates an electrode array 500 and an electrolyte solution. In FIG. 5, the alternate long and short dash line shows the liquid level of the electrolyte solution. Electrode array 500 is immersed in the electrolyte solution. In other words, part of the electrolyte solution is present inside electrode array 500.

<<Electrode Array>>

Figure 6:
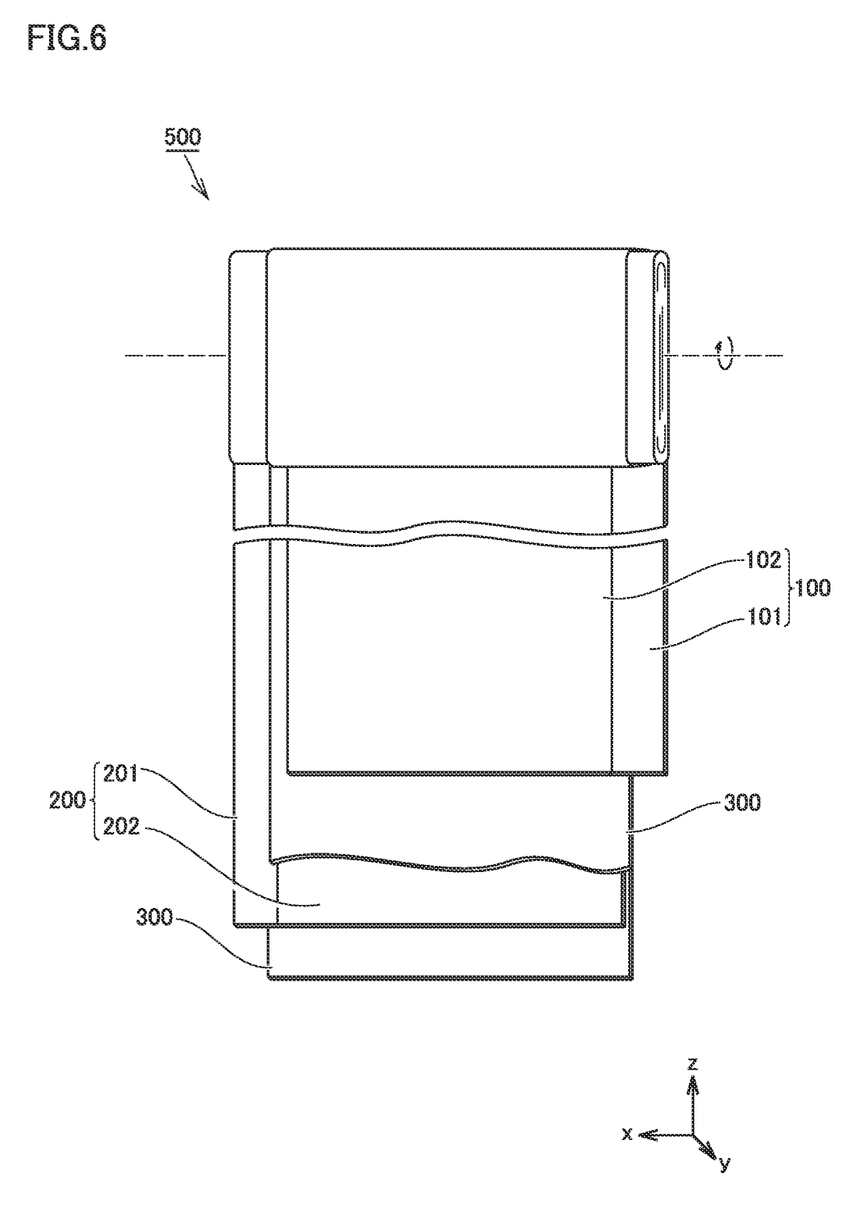
FIG. 6 is a schematic view illustrating the structure of an electrode array according to the present embodiment.

FIG. 6 is a schematic view illustrating the structure of the electrode array according to the present embodiment.

Electrode array 500 is a wound-type electrode array. More specifically, electrode array 500 is composed of a positive electrode 100, one separator 300, a negative electrode 200, and another separator 300 that are stacked in this order and then wound in a spiral fashion. It should be noted that the electrode array according to the present embodiment is not limited to a wound-type one. The electrode array according to the present embodiment may be a stack-type one. A stack-type electrode array may be formed by, for example, stacking a positive electrode and a negative electrode atop one another with a separator interposed therebetween.

<<Positive Electrode>>

Figure 7:
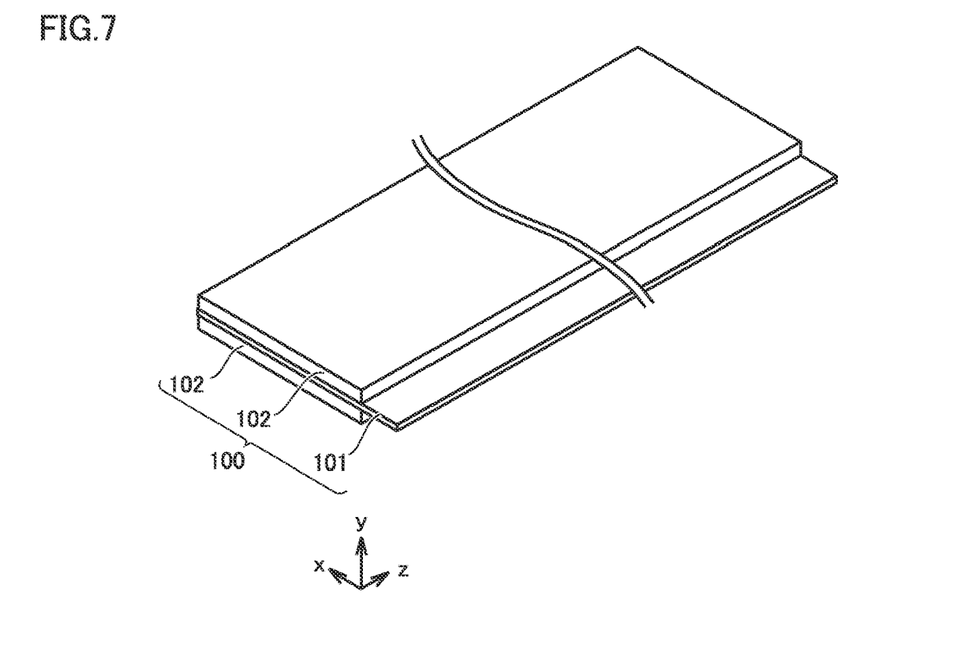
FIG. 7 is a schematic view illustrating the structure of a positive electrode according to the present embodiment.

FIG. 7 is a schematic view illustrating the structure of the positive electrode according to the present embodiment.

Battery 1000 includes at least positive electrode 100 (electrode). Positive electrode 100 is a belt-shaped sheet. Positive electrode 100 includes a positive electrode composite material layer 102 and a positive electrode current collector 101. Between positive electrode composite material layer 102 and positive electrode current collector 101, an intermediate layer 20 (FIG. 4) is interposed (not shown in FIG. 7). In other words, battery 1000 includes at least positive electrode composite material layer 102 (electrode composite material layer), intermediate layer 20, and positive electrode current collector 101 (electrode current collector).

<<Intermediate Layer>>

As shown in FIG. 4, intermediate layer 20 is interposed between positive electrode composite material layer 102 and positive electrode current collector 101. Intermediate layer 20 may be formed on a surface of positive electrode current collector 101. Alternatively, intermediate layer 20 may be formed on both sides of positive electrode current collector 101.

Intermediate layer 20 may have a thickness not smaller than 3 µm and not greater than 30 µm, for example. The "layer thickness" herein may be measured in an electron microscopic (SEM) image of a cross section of the layer along a thickness direction. The cross-sectional sample used for the SEM imaging may have been processed by the focused ion beam (FIB) technique, for example. Measurement of the layer thickness may be carried out at at least three positions. The arithmetic mean of these at least three thickness measurements may be defined as the layer thickness. It is desirable that the positions for the measurement are spaced at regular intervals. It is desirable that the positions for the measurement are spaced no smaller than 10 mm apart.

(Insulating Particles)

Intermediate layer 20 contains at least insulating particles 21 and conductive particles 22. Intermediate layer 20 may contain insulating particles 21 in an amount, for example, not lower than 93 mass % and not higher than 97.995 mass %. For example, intermediate layer 20 may contain insulating particles 21 in an amount not higher than 97.99 mass %, may contain insulating particles 21 in an amount not higher than 97.9 mass %, or may contain insulating particles 21 in an amount not higher than 97 mass %. For example, intermediate layer 20 may contain insulating particles 21 in an amount not lower than 95 mass %. When the amount is within these ranges, inhibition of an increase of a short-circuit current is expected to be obtained, for example.

Each insulating particle 21 has an electric resistivity not lower than $10^5$ Ω·cm. Insulating particles 21 may be ceramic particles, for example. Insulating particles 21 may be particles of alumina (α-alumina, $Al_2O_3$), boehmite (AlOOH), titania ($TiO_2$), zirconia ($ZrO_2$), silica ($SiO_2$), aluminum hydroxide $[Al(OH)_3]$, magnesium hydroxide $[Mg(OH)_2]$, silicon nitride ($Si_3N_4$), boron nitride (BN), aluminum nitride (AlN), or silicon carbide (SiC), for example. One type of insulating particles 21 may be used alone. Two or more types of insulating particles 21 may be used in combination. In other words, insulating particles 21 may be particles made of at least one selected from the group consisting of alumina, boehmite, titania, zirconia, silica, aluminum hydroxide, magnesium hydroxide, silicon nitride, boron nitride, aluminum nitride, and silicon carbide.

Insulating particles 21 may have an average particle size not smaller than 0.1 µm and not greater than 2 µm, for example. The average particle size of insulating particles 21 may be measured in an SEM image of a cross section of intermediate layer 20 along a thickness direction. In other words, the average particle size of insulating particles 21 is the arithmetic mean of Feret sizes of insulating particles 21 in the SEM image. The arithmetic mean may be calculated based on ten insulating particles 21 that are randomly selected in the SEM image.

(Shape of Insulating Particles)

Figure 8:
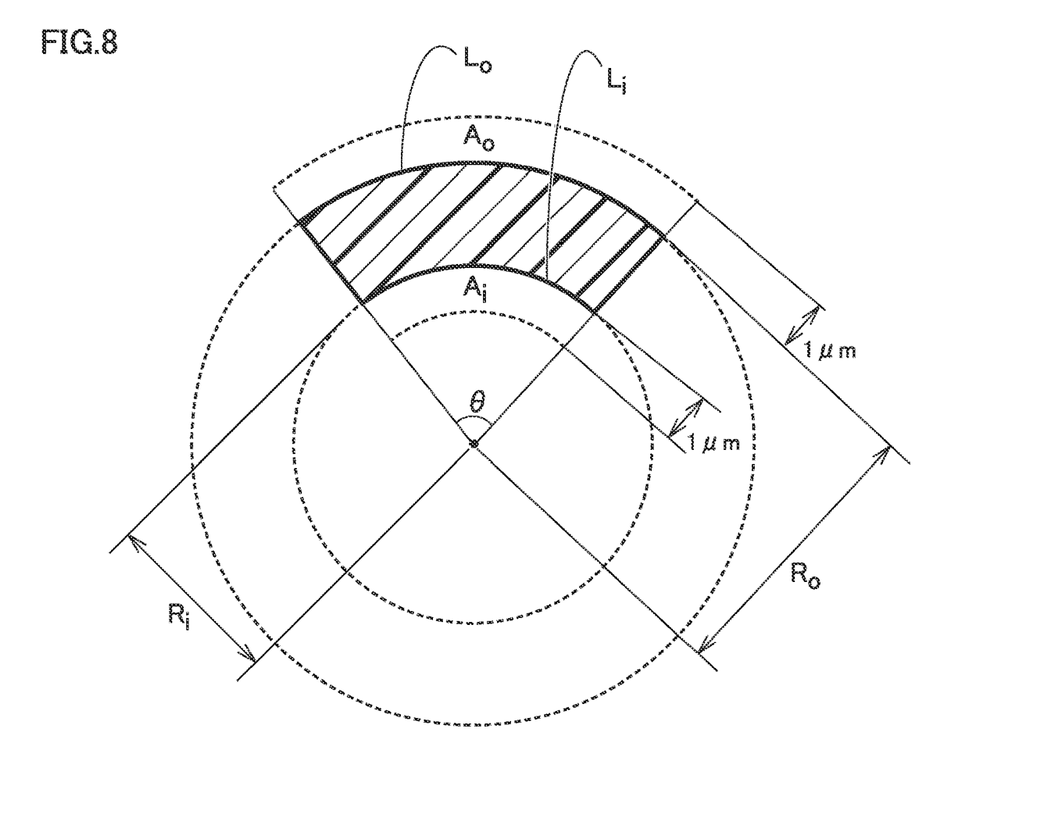
FIG. 8 is a conceptual cross-sectional view that describes the shapes of insulating particles.

FIG. 8 is a conceptual cross-sectional view that describes the shapes of the insulating particles.

Within a cross section of intermediate layer 20 along a thickness direction, each insulating particle 21 has an arc shape. The arc shape refers to a shape that curves to one direction. The arc shape includes an outer-circumference line ($L_o$) and an inner-circumference line ($L_i$). The outer-circumference line ($L_o$) has a first radius of curvature ($R_O$). The first radius of curvature ($R_O$) is the radius of an imaginary circle that is drawn so that it includes the outer-circumference line ($L_o$) as part of its circumference. The inner-circumference line $L_i$ has a second radius of curvature ($R_i$). The second radius of curvature ($R_i$) is the radius of an imaginary circle that is drawn so that it includes the inner-circumference line ($L_i$) as part of its circumference. Dividing the second radius of curvature ($R_i$) by the first radius of curvature ($R_O$) produces a curvature radius ratio ($R_i/R_O$). Measurement of the curvature radius ratio may be carried out for ten insulating particles 21 that are randomly selected in the SEM image. The arithmetic mean of these ten curvature radius ratios may be used as the measurement result.

Theoretically, the curvature radius ratio is lower than 1. For example, the curvature radius ratio may be not lower than 0.2 and not higher than 0.95. For example, the curvature radius ratio may be not lower than 0.3 and not higher than 0.95. When the curvature radius ratio is within these ranges, inhibition of an increase of a short-circuit current is expected to be obtained, for example. The curvature radius ratio may be not lower than 0.5 and not higher than 0.75, for example. When the curvature radius ratio is within this range, improvement of the filling factor of insulating particles 21 is expected to be obtained, for example.

A central angle (θ) according to the present embodiment refers to the average of the following values: the central angle of an imaginary sector that is drawn so that it has the outer-circumference line ($L_o$) as its circumference; and the central angle of an imaginary sector that is drawn so that it has the inner-circumference line ($L_i$) as its circumference. The central angle (θ) may be not smaller than 30° and not greater than 270°, for example. When the central angle is within this range, improvement of the filling factor of insulating particles 21 is expected to be obtained. Measurement of the central angle (θ) may be carried out for ten insulating particles 21 that are randomly selected in the SEM image. The arithmetic mean of these ten central angles (θ) may be used as the measurement result.

(Conductive Particles)

Intermediate layer 20 may contain conductive particles 22 in an amount not lower than 0.005 mass % and not higher than 5 mass %, for example. Intermediate layer 20 may contain conductive particles 22 in an amount not lower than 0.01 mass % and not higher than 5 mass %, for example. When the amount is within these ranges, the resistance of the battery is expected to be low during, for example, normal use. For example, intermediate layer 20 may contain conductive particles 22 in an amount not lower than 0.1 mass % or may contain conductive particles 22 in an amount not lower than 1 mass %. When the amount is within this range, the resistance of the battery is expected to be low during, for example, normal use. Intermediate layer 20 may contain conductive particles 22 in an amount not higher than 3 mass %, for example. When the amount is within this range, inhibition of an increase of a short-circuit current is expected to be obtained, for example.

Conductive particles 22 may be made of a conductive, solid carbon material. Conductive particles 22 may be particles of acetylene black (AB), Ketjenblack (KB, registered trademark), graphite, graphene, vapor grown carbon fiber (VGCF), or carbon nanotube (CNT), for example. One type of conductive particles 22 may be used alone. Two or more types of conductive particles 22 may be used in combination. In other words, conductive particles 22 may be particles made of at least one selected from the group consisting of AB, KB, graphite, graphene, VGCF, and CNT.

(Degree of Biased Distribution of Conductive Particles)

Within a cross section of intermediate layer 20 along a thickness direction, conductive particles 22 has a specific distribution. Namely, more conductive particles 22 are present on the outer-circumference side of each arc shape (insulating particle 21) than on the inner-circumference side of the arc shape. The distribution of conductive particles 22 may be checked by using the degree of biased distribution.

In the SEM image of a cross section of intermediate layer 20 along a thickness direction shown in FIG. 8, a region with a width of 1 μm extending from the outer-circumference line ($L_o$) in a direction away from the inner-circumference line ($L_i$) is defined as an outer-circumference region ($A_o$); and a region with a width of 1 μm extending from the inner-circumference line ($L_i$) in a direction away from the outer-circumference line ($L_o$) is defined as an inner-circumference region ($A_i$). Conductive particles 22 have a first concentration in the outer-circumference region ($A_o$). Conductive particles 22 have a second concentration in the inner-circumference region ($A_i$).

A carbon concentration ($C_o$) of the outer-circumference region ($A_o$) is measured by area analysis (mapping) using, for example, an electron probe micro analyzer (EMPA). Also, a carbon concentration ($C_i$) of the inner-circumference region ($A_i$) is measured in the same manner. Dividing the carbon concentration ($C_o$) by the carbon concentration ($C_i$) produces the degree of biased distribution ($C_o/C_i$).

The degree of biased distribution ($C_o/C_i$) is the ratio of the first concentration to the second concentration. Measurement of the degree of biased distribution is carried out for ten insulating particles 21 that are randomly selected in the SEM image. The arithmetic mean of these ten values of the degree of biased distribution may be used as the measurement result. It is considered that when the degree of biased distribution is higher than 1, more conductive particles 22 are present on the outer-circumference side of each arc shape than on the inner-circumference side of the arc shape.

The degree of biased distribution may be not lower than 2 and not higher than 50. When the degree of biased distribution is within this range, inhibition of an increase of a short-circuit current is expected to be obtained, for example. For example, the degree of biased distribution may be not lower than 5, may be not lower than 8, or may be not lower than 15. When the degree of biased distribution is within these ranges, inhibition of an increase of a short-circuit current is expected to be obtained, for example. The degree of biased distribution may be not higher than 25, for example. When the degree of biased distribution is within this range, the resistance of the battery is expected to be low during, for example, normal use.

(Binder)

Intermediate layer 20 may further contain a binder (not shown). In other words, the portion of intermediate layer 20 that is not occupied by insulating particles 21 or conductive particles 22 may be made up of the binder. The binder is not particularly limited. The binder may be polyethylene (PE), polypropylene (PP), poly(vinylidene fluoride) (PVdF), polytetrafluoroethylene (PTFE), styrene.butadiene rubber (SBR), or an ethylene-(acrylic acid ester) copolymer, for example. One type of the binder may be used alone. Two or more types of the binder may be used in combination. In other words, the binder may be at least one selected from the group consisting of PE, PP, PVdF, PTFE, SBR, and ethylene-(acrylic acid ester) copolymer.

(Porosity)

Intermediate layer 20 may have a porosity not lower than 5% and not higher than 48%, for example. The lower the porosity is, the more likely the inhibition of an increase of a short-circuit current is to be obtained. The porosity refers to a value (percentage) obtained by dividing the apparent density of intermediate layer 20 by the true density of intermediate layer 20. The apparent density may be calculated from the thickness and the area of intermediate layer 20. The true density may be calculated from the composition of intermediate layer 20 and the true density of each constituent of the intermediate layer. The composition of intermediate layer 20 may be identified by ICP emission spectrochemical analysis (ICP-AES) or EPMA, for example.

Intermediate layer 20 may have a porosity not higher than 35%, for example. Intermediate layer 20 may have a porosity not lower than 5% and not higher than 30%, for example. When the porosity is within these ranges, inhibition of an increase of a short-circuit current is expected to be obtained. Furthermore, the resistance of the battery is expected to be low during normal use. Intermediate layer 20 may have a porosity not higher than 20% or may have a porosity not higher than 10%. It is difficult to form intermediate layer 20 with a porosity lower than 5% by using a typical compressing means. The reason is considered to be as follows: positive electrode composite material layer 102 and positive electrode current collector 101 are more likely to be deformed than intermediate layer 20 is; therefore, when the compression rate reaches a certain value or higher, the compression force is less likely to be conveyed to intermediate layer 20. It should be noted that intermediate layer 20 may have a porosity lower than 5% as long as formation of intermediate layer 20 is possible.

(Positive Electrode Composite Material Layer)

Positive electrode composite material layer 102 is formed on a surface of intermediate layer 20. Positive electrode composite material layer 102 may have a thickness not smaller than 10 μm and not greater than 200 μm, for example. Positive electrode composite material layer 102 contains at least positive electrode active material particles. For example, positive electrode composite material layer 102 may contain the positive electrode active material particles in an amount not lower than 80 mass % and not higher than 98 mass %, conductive particles in an amount not lower than 1 mass % and not higher than 10 mass %, and a binder in an amount not lower than 1 mass % and not higher than 10 mass %.

The positive electrode active material particles may have a d50 value not lower than 1 μm and not higher than 30 μm, for example. The "d50" value herein may be measured by laser diffraction and scattering. d50 refers to the particle size in volume-based particle size distribution at which the cumulative particle volume (accumulated from the side of small sizes) reaches 50% of the total particle volume.

The positive electrode active material particles electrochemically occlude and release electric charge carriers (lithium ions in the present embodiment). The positive electrode active material particles are not particularly limited. The positive electrode active material particles may be particles of $LiCoO_2$, $LiNiO_2$, $LiMnO_2$, $LiMn_2O_4$, $LiNi_{1/3}Co_{1/3}Mn_{1/3}O_2$, $LiNi_{0.8}Co_{0.15}Mn_{0.05}O_2$, or $LiFePO_4$, for example. One type of the positive electrode active material particles may be used alone. Two or more types of the positive electrode active material particles may be used in combination. The conductive particles are not particularly limited. The conductive particles may be particles of AB, for example. The binder is not particularly limited either. The binder may be PVdF, for example.

(Positive Electrode Current Collector)

Positive electrode current collector 101 is an electrode base material that is conductive. Positive electrode current collector 101 may have a thickness not smaller than 5 μm and not greater than 50 μm, for example. Positive electrode current collector 101 may be made of pure Al foil or Al alloy foil, for example. In FIG. 7, the part of positive electrode current collector 101 protruding from positive electrode composite material layer 102 in the x-axis direction may be used for connection to positive electrode terminal 901 (FIG. 5).

<<Negative Electrode>>

Figure 9:
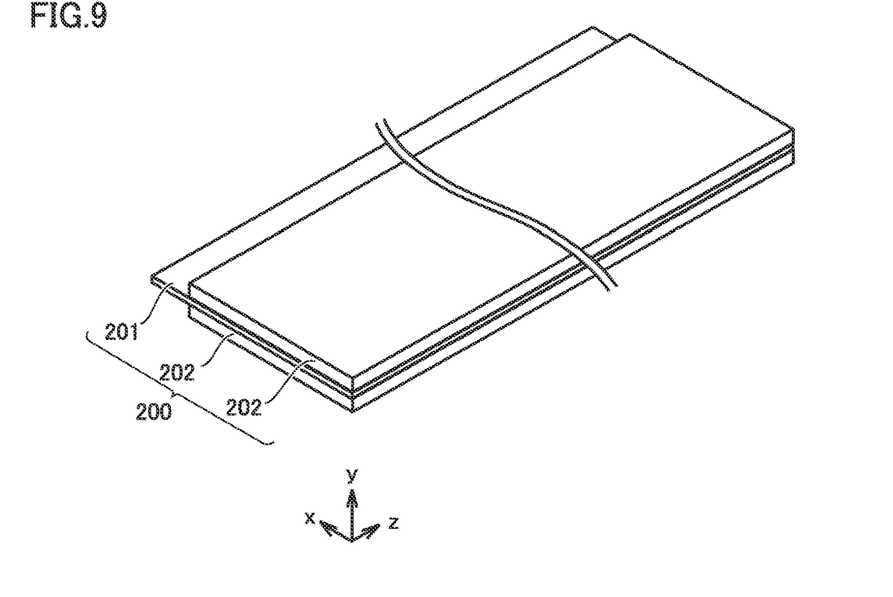
FIG. 9 is a schematic view illustrating the structure of a negative electrode according to the present embodiment.

FIG. 9 is a schematic view illustrating the structure of the negative electrode according to the present embodiment.

Battery 1000 includes at least negative electrode 200 (electrode). Negative electrode 200 is a belt-shaped sheet. Negative electrode 200 includes a negative electrode composite material layer 202 (electrode composite material layer) and a negative electrode current collector 201 (electrode current collector). Between negative electrode composite material layer 202 and negative electrode current collector 201, the same intermediate layer 20 as one described above may be interposed. In other words, in the present embodiment, at least one of positive electrode 100 and negative electrode 200 includes intermediate layer 20.

(Negative Electrode Composite Material Layer)

Negative electrode composite material layer 202 is formed on a surface of negative electrode current collector 201. Negative electrode composite material layer 202 may be formed on both sides of negative electrode current collector 201. Negative electrode composite material layer 202 may have a thickness not smaller than 10 μm and not greater than 200 μm, for example. Negative electrode composite material layer 202 contains at least negative electrode active material particles. For example, negative electrode composite material layer 202 may contain the negative electrode active material particles in an amount not lower than 90 mass % and not higher than 99 mass % and a binder in an amount not lower than 1 mass % and not higher than 10 mass %.

The negative electrode active material particles may have a d50 value not lower than 1 μm and not higher than 30 μm, for example. The negative electrode active material particles electrochemically occlude and release electric charge carriers. The negative electrode active material particles are not particularly limited. The negative electrode active material particles may be particles of artificial graphite, natural graphite, soft carbon, hard carbon, silicon, silicon oxide, silicon-based alloy, tin, tin oxide, tin-based alloy, or $Li_4Ti_5O_{12}$, for example. One type of the negative electrode active material particles may be used alone. Two or more types of the negative electrode active material particles may be used in combination. The binder is not particularly limited. The binder may be carboxymethylcellulose (CMC) or SBR, for example.

(Negative Electrode Current Collector)

Negative electrode current collector 201 is an electrode base material that is conductive. Negative electrode current collector 201 may have a thickness not smaller than 5 μm and not greater than 50 μm, for example. Negative electrode current collector 201 may be made of pure copper (Cu) foil or Cu alloy foil, for example. In FIG. 9, the part of negative electrode current collector 201 protruding from negative electrode composite material layer 202 in the x-axis direction may be used for connection to negative electrode terminal 902 (FIG. 5).

<<Separator>>

Battery 1000 may include separator 300. Separator 300 is a belt-shaped film. Separator 300 is interposed between positive electrode 100 and negative electrode 200. Separator 300 may have a thickness not smaller than 5 μm and not greater than 30 μm, for example. Separator 300 is porous. Separator 300 electrically insulates positive electrode 100 from negative electrode 200. Separator 300 may be a porous PE film or a porous PP film, for example.

Separator 300 may have a monolayer structure, for example. Separator 300 may consist of a porous PE film, for example. Separator 300 may have a multilayer structure, for example. Separator 300 may be formed, for example, by stacking a porous PP film, a porous PE film, and a porous PP film in this order. Separator 300 may include a heat-resistant layer on a surface. The heat-resistant layer is a layer containing a heat-resistant material. The heat-resistant material may be alumina or polyimide, for example.

<<Electrolyte Solution>>

Battery 1000 may include an electrolyte solution. The electrolyte solution contains at least a lithium (Li) salt and a solvent. The electrolyte solution may contain a Li salt in an amount not lower than 0.5 mol/l and not higher than 2 mol/l, for example. The Li salt is a supporting electrolyte. The Li salt is dissolved in the solvent. The Li salt may be $LiPF_6$, $LiBF_4$, $Li[N(FSO_2)_2]$, or $Li[N(CF_3SO_2)_2]$, for example. One type of the Li salt may be used alone. Two or more types of the Li salt may be used in combination.

The solvent is aprotic. In other words, the electrolyte solution according to the present embodiment is a non-aqueous electrolyte. The solvent may be a mixture of a cyclic carbonate and a chain carbonate, for example. The mixing ratio may be "(cyclic carbonate):(chain carbonate)= 1:9 to 5:5 (volume ratio)", for example.

The cyclic carbonate may be ethylene carbonate (EC), propylene carbonate (PC), butylene carbonate (BC), or fluoroethylene carbonate (FEC), for example. One type of the cyclic carbonate may be used alone. Two or more types of the cyclic carbonate may be used in combination.

The chain carbonate may be dimethyl carbonate (DMC), ethyl methyl carbonate (EMC), or diethyl carbonate (DEC), for example. One type of the chain carbonate may be used alone. Two or more types of the chain carbonate may be used in combination.

The solvent may contain a lactone, a cyclic ether, a chain ether, or a carboxylic acid ester, for example. The lactone may be γ-butyrolactone (GBL) or γ-valerolactone, for example. The cyclic ether may be tetrahydrofuran (THF), 1,3-dioxolane, or 1,4-dioxane, for example. The chain ether may be 1,2-dimethoxyethane (DME), for example. The carboxylic acid ester may be methyl formate (MF), methyl acetate (MA), or methyl propionate (MP), for example.

The electrolyte solution may further contain various functional additives in addition to the Li salt and the solvent. The electrolyte solution may contain the functional additives in an amount not lower than 1 mass % and not higher than 5 mass %, for example. Examples of the functional additives include a gas generating agent (anti-overcharging additive) and a solid electrolyte interface (SEI) film-forming agent. The gas generating agent may be cyclohexylbenzene (CHB) or biphenyl (BP), for example. The SEI-film-forming agent may be vinylene carbonate (VC), vinylethylene carbonate (VEC), $Li[B(C_2O_4)_2]$, $LiPO_2F_2$, propane sultone (PS), or ethylene sulfite (ES), for example.

Battery 1000 according to the present embodiment may contain a gelled electrolyte and a solid electrolyte instead of the electrolyte solution (liquid electrolyte). Battery 1000 may contain a gelled electrolyte and a solid electrolyte in addition to the electrolyte solution.

<Method of Producing Non-Aqueous Electrolyte Secondary Battery>

The non-aqueous electrolyte secondary battery according to the present embodiment may be produced by the following method, for example.

Figure 10:
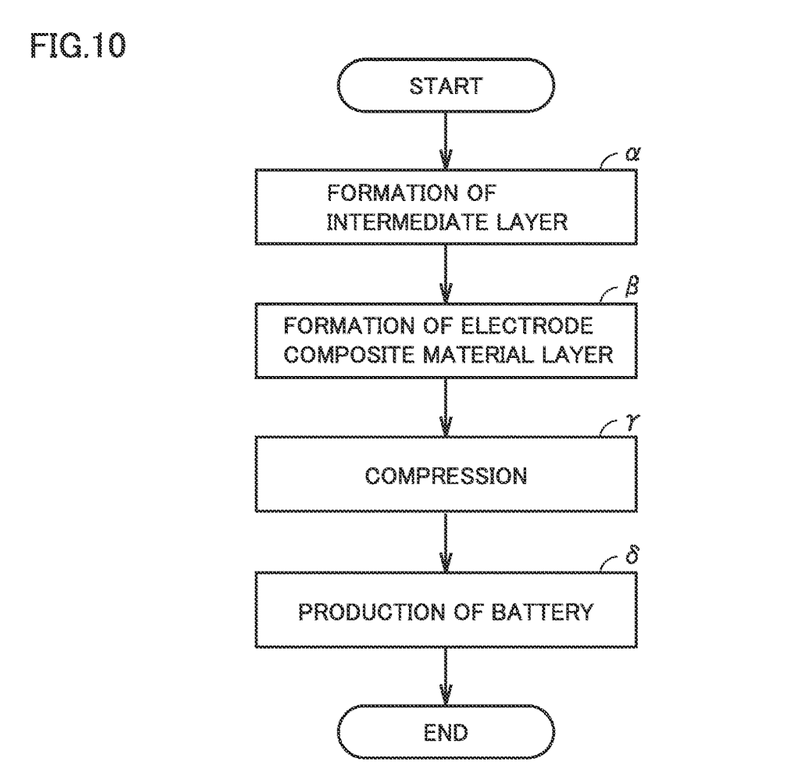
FIG. 10 is a flow chart schematically showing a method of producing a non-aqueous electrolyte secondary battery according to the present embodiment.

FIG. 10 is a schematic flow chart showing a method of producing the non-aqueous electrolyte secondary battery according to the present embodiment. The method according to the present embodiment includes "(α) formation of an intermediate layer", "(β) formation of an electrode composite material layer", "(γ) compression", and "(δ) production of a battery". In other words, the method according to the present embodiment includes at least, "(α) formation of an intermediate layer", "(β) formation of an electrode composite material layer", and "(γ) compression".

<<(α) Formation of Intermediate Layer>>

The method according to the present embodiment includes forming intermediate layer 20 on a surface of an electrode current collector (positive electrode current collector 101 in the present embodiment). Intermediate layer 20 is formed so as to contain at least hollow particles 23 and conductive particles 22 (FIG. 3). Intermediate layer 20 may be formed on both sides of the electrode current collector.

For example, hollow particles 23, conductive particles 22, a binder, and a solvent may be mixed to prepare slurry. The resulting slurry may be applied to a surface of positive electrode current collector 101 and then dried to form intermediate layer 20. Intermediate layer 20 contains hollow particles 23, conductive particles 22, and the binder. In other words, intermediate layer 20 is formed so as to contain at least hollow particles 23 and conductive particles 22. Applying the slurry may be carried out by gravure coating or die coating, for example. Drying the slurry may be carried out by using hot air or infrared light, for example.

Conductive particles 22 and the binder are described above in detail. The solvent is selected as appropriate depending on the type of the binder. When the binder is PVdF, the solvent may be N-methyl-2-pyrrolidone (NMP), for example.

(Hollow Particles)

Each hollow particle 23 has a cavity inside. Hollow particles 23 are precursors of insulating particles 21 described above. Hollow particles 23 may be hollow particles made of alumina or the like as described above. In the step of "(γ) compression" described below, hollow particles 23 are made broken and insulating particles 21 are formed. Hollow particle 23 may have a d50 value not lower than 0.1 μm and not higher than 5 μm, for example. Hollow particle 23 may have a d50 value not lower than 1 μm and not higher than 5 μm, for example.

(Percent Hollowness)

Each hollow particle 23 may have a percent hollowness not lower than 0.2 and not higher than 0.95, for example. When the percent hollowness is within this range, a preferable state of breakage tends to be obtained. The percent hollowness refers to the ratio of a cavity size to a particle size. It is considered that the value of the curvature radius ratio of each insulating particle 21 (after breakage) is close to the value of the percent hollowness of the corresponding hollow particle 23. The percent hollowness may be measured in an SEM image of a cross section of the hollow particle. For example, hollow particles 23 are embedded in a predetermined resin and the resin may be cut so as to prepare cross-sectional samples of hollow particles 23. Measurement of the percent hollowness may be carried out for ten hollow particles 23. The arithmetic mean of these ten values of percent hollowness may be used as the measurement result.

For example, each hollow particle 23 may have a percent hollowness not lower than 0.3 or may have a percent hollowness not lower than 0.5. For example, each hollow particle 23 may have a percent hollowness not higher than 0.9 or may have a percent hollowness not higher than 0.75.

When the percent hollowness is within these ranges, improvement of the filling factor of insulating particles 21 is expected to be obtained.

(Martens Hardness)

Each hollow particle 23 may have a Martens hardness not lower than 0.1 MPa and not higher than 3 GPa, for example. When the Martens hardness is within this range, a preferable state of breakage tends to be obtained. The "Martens hardness" herein may be measured with a microhardness tester. For example, a microhardness tester under trade name "PICODENTOR HM500" manufactured by Fischer or a similar product may be used. Measurement of Martens hardness may be carried out for ten hollow particles 23. The arithmetic mean of these ten values of Martens hardness may be used as the measurement result. Each hollow particle 23 may have a Martens hardness not lower than 1 MPa or may have a Martens hardness not lower than 10 MPa, for example. Each hollow particle 23 may have a Martens hardness not higher than 2 GPa or may have a Martens hardness not higher than 1 GPa, for example.

<<(β) Formation of Electrode Composite Material Layer>>

The method according to the present embodiment includes forming an electrode composite material layer (positive electrode composite material layer 102 in the present embodiment) on a surface of intermediate layer 20.

The method of forming positive electrode composite material layer 102 is not particularly limited. For example, positive electrode active material particles, conductive particles, a binder, and a solvent may be mixed to prepare slurry. The resulting slurry may be applied to a surface of intermediate layer 20 and then dried to form positive electrode composite material layer 102. The positive electrode active material particles and the like are described above in detail.

<<(γ) Compression>>

The method according to the present embodiment includes compressing intermediate layer 20. In the present embodiment, compression of intermediate layer 20 causes breakage of hollow particles 23. Breakage of hollow particles 23 causes formation of insulating particles 21. Each insulating particle 21 thus formed has the arc shape described above in a cross section of intermediate layer 20 along a thickness direction. In addition, more conductive particles 22 are present on the outer-circumference side of each arc shape than on the inner-circumference side of the arc shape. This phenomenon is attributed to the absence of conductive particles 22 inside hollow particles 23.

Positive electrode composite material layer 102, intermediate layer 20, and positive electrode current collector 101 may be rolled together by using, for example, a roll press. By this process, intermediate layer 20 may be compressed.

In the present embodiment, hollow particles 23 are easily made broken and therefore a high compression rate may be obtained. The compression rate may be calculated by the following expression:

Compression rate (%)={1−(thickness after compression)/(thickness before compression)}×100.

The compression rate may be not lower than 30% and not higher than 98%, for example. When the compression rate is within this range, improvement of the filling factor of insulating particles 21 is expected to be obtained. The compression rate may be not lower than 40% or may be not lower than 50%, for example. The compression rate may be not higher than 95% or may be not higher than 90%, for example.

After compression, positive electrode composite material layer 102, intermediate layer 20, and positive electrode current collector 101 may be cut together into a predetermined shape (a belt shape, for example) by using, for example, a roll slitter. Thus, an electrode (positive electrode 100 in the present embodiment) is prepared.

<<(δ) Production of Battery>>

The method according to the present embodiment includes producing battery 1000. The battery includes at least the electrode prepared above. The electrode includes intermediate layer 20.

For example, electrode array 500 is formed. Electrode array 500 may be formed by stacking positive electrode 100, separator 300, negative electrode 200, and separator 300 in this order and then winding them in a spiral fashion.

Casing 1001 and an electrolyte solution are prepared. Casing 1001 and the electrolyte solution are described above in detail. Positive electrode 100 is electrically connected to positive electrode terminal 901. Negative electrode 200 is electrically connected to negative electrode terminal 902. Electrode array 500 is placed in casing 1001. The electrolyte solution is injected into casing 1001. Casing 1001 is hermetically sealed. Electrode array 500 is immersed in the electrolyte solution. Thus, battery 1000 according to the present embodiment may be produced.

<Use Etc. of Non-Aqueous Electrolyte Secondary Battery>

In battery 1000 according to the present embodiment, inhibition of an increase of a short-circuit current at the time of an internal short circuit is expected to be obtained. This feature is considered to be suitable for a high-capacity battery in which a flow of a large short-circuit current may occur.

Examples of the high-capacity battery include power supplies for driving, for example, hybrid vehicles (HV), plug-in hybrid vehicles (PHV), and electric vehicles (EV). It should be noted that the use of battery 1000 according to the present embodiment is not limited to vehicle-mounted applications. Battery 1000 according to the present embodiment may be used in any application.

EXAMPLES

In the following, examples according to the present disclosure are described. The scope of claims is not limited to the following description.

Example 1

<<(α) Formation of Intermediate Layer>>

1. Preparation of Positive Electrode

The following materials were prepared.

Hollow particles: alumina, d50=3 μm, percent hollowness=0.5

Conductive particles: AB

Binder: PVdF

Solvent: NMP

Positive electrode current collector: Al foil (thickness=20 μm, width dimension=130 mm)

The width dimension refers to a dimension in the x-axis direction in FIG. 7 or the like.

Hollow particles 23, conductive particles 22, the binder, and the solvent were mixed to prepare slurry. The mixing ratio was "(hollow particles):(conductive particles):binder=95:3:2 (mass ratio)". The resulting slurry was applied to the surface (both sides) of positive electrode current collector 101 and then dried to form intermediate layer 20. In other words, intermediate layer 20 was formed so as to contain at least hollow particles 23 and conductive particles 22. Intermediate layer 20 has a width dimension of 110 mm.

<<(β) Formation of Electrode Composite Material Layer>>

The following materials were prepared.

Positive electrode active material particles: $LiNi_{1/3}Co_{1/3}Mn_{1/3}O_2$

Conductive particles: AB

Binder: PVdF

Solvent: NMP

The positive electrode active material particles, the conductive particles, the binder, and the solvent were mixed to prepare slurry. The mixing ratio was "(positive electrode active material particles):(conductive particles):binder=90:8:2 (mass ratio)". The resulting slurry was applied to cover the entire surface of intermediate layer 20 and then dried to form positive electrode composite material layer 102. In other words, an electrode composite material layer was formed on the surface of intermediate layer 20. Positive electrode composite material layer 102 (after drying, one side) has a coating weight per unit area of 25 mg/cm². Positive electrode composite material layer 102 has a width dimension of 110 mm, like intermediate layer 20 does.

<<(γ) Compression>>

Positive electrode composite material layer 102, intermediate layer 20, and positive electrode current collector 101 were rolled together by using a roll press. In other words, intermediate layer 20 was compressed. Intermediate layer 20 after compression has a porosity of 20%. Thus, positive electrode 100 was prepared.

<<(δ) Production of Battery>>

2. Preparation of Negative Electrode

The following materials were prepared.

Negative electrode active material particles: natural graphite

Binder: CMC and SBR

Solvent: water

Negative electrode current collector: Cu foil (thickness=10 μm, width dimension=132 mm)

The width dimension refers to a dimension in the x-axis direction in FIG. 9 or the like.

The negative electrode active material particles, the binder, and the solvent were mixed to prepare slurry. The resulting slurry was applied to the surface (both sides) of negative electrode current collector 201 and then dried to form negative electrode composite material layer 202. Negative electrode composite material layer 202 (after drying, one side) has a coating weight per unit area of 20 mg/cm². Negative electrode composite material layer 202 has a width dimension of 112 mm. Thus, negative electrode 200 was prepared.

3. Preparation of Separator

The following materials were prepared.

Heat-resistant material: solid particle (alumina)

Binder: ethylene-(acrylic acid ester) copolymer

Solvent: water

Separator: porous PE film (thickness=20 μm, width dimension=120 mm)

The heat-resistant material, the binder, and the solvent were mixed to prepare slurry. The resulting slurry was applied to a surface of separator 300 and then dried to form a heat-resistant layer. The heat-resistant layer has a thickness of 4 μm. Thus, separator 300 was prepared.

4. Preparation of Electrolyte Solution

An electrolyte solution was prepared. The electrolyte solution has the following composition.

Li salt: $LiPF_6$ (1 mol/l)

Solvent: [EC:EMC:DEC=3:5:2 (volume ratio)]

5. Assembling

Positive electrode 100, separator 300, negative electrode 200, and separator 300 were stacked in this order and then wound in a spiral fashion. Thus, electrode array 500 was formed.

Casing 1001 having a prismatic shape was prepared. Casing 1001 has the following outer dimensions: height dimension (75 mm)×width dimension (120 mm)×depth dimension (15 mm). The height dimension refers to a dimension in the z-axial direction in FIG. 5. The width dimension refers to a dimension in the x-axis direction in FIG. 5. The depth dimension refers to a dimension in the y-axis direction in FIG. 5. Casing 1001 has a wall thickness of 1 mm.

Into casing 1001, electrode array 500 was placed. Into casing 1001, the electrolyte solution was injected. Casing 1001 was hermetically sealed. Thus, battery 1000 (lithium-ion secondary battery having a prismatic shape) was produced. Battery 1000 was designed to have a rated capacity of 5 Ah within a voltage range from 3.0 to 4.1 V.

6. Initial Charge and Discharge

Under an environment at 25° C., battery 1000 was charged to 4.2 V at a rate of 1 C. At a rate of "1 C", charging completes and the rated capacity is obtained in one hour. Five minutes later, battery 1000 was discharged to 3.0 V at a rate of 1 C.

Then, the initial capacity of battery 1000 was determined by carrying out charging in the constant current constant voltage (CC-CV) mode described below and discharging in the CC-CV mode described below.

Charging in CC-CV mode: CC=1 C, CV=4.1 V, cut-off current=0.01 C

Discharging in CC-CV mode: CC=1 C, CV=3.0 V, cut-off current=0.01 C

Comparative Example 1

Battery 1000 was produced in the same manner as in Example 1 except that solid particles (alumina, d50=3 μm, percent hollowness=0) were used instead of hollow particles 23.

Examples 2 to 14

Battery 1000 was produced in the same manner as in Example 1 except that the slurry composition and the compression conditions, for example, were changed and intermediate layer 20 shown in Table 1 below was formed.

Examples 15 to 17

A particle composing machine (trade name "Nobilta" manufactured by Hosokawa Micron Corporation) was prepared. The particle composing machine was used to coat the surfaces of hollow particles 23 with AB. After coating, the resulting hollow particles 23 were made broken. The resulting, broken hollow particles 23 were used to form intermediate layer 20. In Table 1 below, the production method in Examples 15 to 17 reads "conductive coating, preliminary breakage". The AB content of intermediate layer 20 is the sum of the amount of AB coating on the surfaces of hollow particles 23 and the amount of AB mixed at the time of slurry preparation. Except for these conditions, the same manner as in Example 1 was adopted and battery 1000 was produced.

As for the examples where symbol "-" is found in the "production method" column in Table 1 below, compression of intermediate layer 20 caused breakage of hollow particles 23 and thus caused formation of insulating particles 21.

Comparative Example 2

Hollow particles 23 with no AB coating were made broken. Except that the resulting, broken hollow particles 23 (insulating particles 21) were used, the same manner as in Example 1 was adopted and battery 1000 was produced. In Table 1 below, the production method in Comparative Example 2 reads "preliminary breakage".

<Evaluation>

<<Curvature Radius Ratio, Degree of Biased Distribution, Porosity>>

The curvature radius ratio, the degree of biased distribution, and the porosity were measured by the methods described above. Results of the measurement are shown in Table 1 below.

<<Nail Penetration Test>>

The state of charge (SOC) of battery 1000 was adjusted to 100%. A nail was prepared. The nail has a shank diameter of 3 mm and an R value of 1 mm at the tip. The nail was driven into battery 1000 at a rate of 1 mm/s. One second after the nail was driven, the level of voltage drop was measured. The measurement of the level of voltage drop is shown in Table 1 below. It is considered that the lower the level of voltage drop is, the greater the inhibition of an increase of a short-circuit current at the time of an internal short circuit is.

<<Resistance of Battery>>

The SOC of battery 1000 was adjusted to 50%. Under an environment at 25° C., battery 1000 was discharged at a rate of 10 C for ten seconds. Ten seconds after the start of the discharging, the level of voltage drop was measured. Based on the relationship between the level of voltage drop and the rate, the resistance of the battery was calculated. It is considered that the lower the resistance of the battery is, the lower the resistance of the battery is during normal use.

TABLE 1

List of Examples and Comparative Examples

| | Intermediate layer | | | | | | Evaluation | |
|---|---|---|---|---|---|---|---|---|
| | Insulating particles | | Conductive particles | | | | | |
| | | Curvature radius ratio ($R_i/R_o$) | | Degree of biased distribution ($C_o/C_i$) | Binder | | | |
| | Content mass % | | Content mass % | | Content mass % | Porosity [%] | Production method | Nail penetration test Level of voltage drop [V] | Resistance of battery [mΩ] |
| Ex. 1 | 95 | 0.5 | 3 | 15 | 2 | 20 | — | 0.3 | 3.5 |
| Ex. 2 | 95 | 0.75 | 3 | 8 | 2 | 10 | — | 0.22 | 3.5 |
| Ex. 3 | 95 | 0.95 | 3 | 5 | 2 | 5 | — | 0.2 | 3.5 |
| Ex. 4 | 95 | 0.3 | 3 | 25 | 2 | 30 | — | 0.4 | 3.5 |
| Ex. 5 | 95 | 0.2 | 3 | 50 | 2 | 48 | — | 0.7 | 3.55 |
| Ex. 6 | 97 | 0.5 | 1 | 15 | 2 | 20 | — | 0.22 | 3.51 |
| Ex. 7 | 97.9 | 0.5 | 0.1 | 15 | 2 | 20 | — | 0.21 | 3.56 |
| Ex. 8 | 97.99 | 0.5 | 0.01 | 15 | 2 | 20 | — | 0.2 | 3.6 |
| Ex. 9 | 97.995 | 0.5 | 0.005 | 15 | 2 | 20 | — | 0.1 | 10.2 |
| Ex. 10 | 93 | 0.5 | 5 | 15 | 2 | 20 | — | 0.5 | 3.5 |
| Ex. 11 | 95 | 0.5 | 3 | 8 | 2 | 10 | — | 0.22 | 3.5 |
| Ex. 12 | 95 | 0.5 | 3 | 25 | 2 | 30 | — | 0.3 | 3.5 |
| Ex. 13 | 95 | 0.5 | 3 | 4 | 2 | 5 | — | 0.2 | 3.5 |
| Ex. 14 | 95 | 0.5 | 3 | 50 | 2 | 35 | — | 0.7 | 5 |
| Ex. 15 | 95 | 0.5 | 3 | 5 | 2 | 20 | Conductive coating, preliminary breakage | 0.35 | 3.5 |
| Ex. 16 | 95 | 0.5 | 3 | 2 | 2 | 20 | Conductive coating, preliminary breakage | 0.4 | 3.5 |
| Ex. 17 | 95 | 0.5 | 3 | 1.5 | 2 | 20 | Conductive coating, preliminary breakage | 0.68 | 3.5 |
| Comp. Ex. 1 | 95 | 0 | 3 | — | 2 | 50 | Solid particle | 0.8 | 3.8 |
| Comp. Ex. 2 | 95 | 0.5 | 3 | 1 | 2 | 20 | Preliminary breakage | 1 | 3.5 |

<Results>

In Comparative Example 1, no insulating particle 21 having an arc shape was observed in a cross section of intermediate layer 20 along a thickness direction. The reason is considered that hard, solid particles were used. In Comparative Example 1, a high level of voltage drop was observed in the nail penetration test. The reason is considered that the solid particles had a low filling factor and therefore there formed current pathway 90 with a low resistance (FIG. 2).

In Comparative Example 2, the degree of biased distribution was 1. The reason is considered that hollow particles 23 had been broken in advance and therefore conductive particles 22 were uniformly distributed on the inner-circumference side and the outer-circumference side of the arc shape (insulating particle 21). Comparative Example 1 had a high level of voltage drop in the nail penetration test. The reason is considered that the distribution of conductive particles 22 was not biased and therefore formation of current pathway 90 with a low resistance was not sufficiently inhibited.

In Examples 1 to 17, compared to Comparative Examples 1 and 2, the level of voltage drop in the nail penetration test was low. In other words, it is considered that an increase of a short-circuit current at the time of an internal short circuit was inhibited. It is considered that breakage of hollow particles 23 improved the filling factor of insulating particles 21 and the biased distribution of conductive particles 22 inhibited the formation of current pathway 90 with a low resistance.

Figure 11:
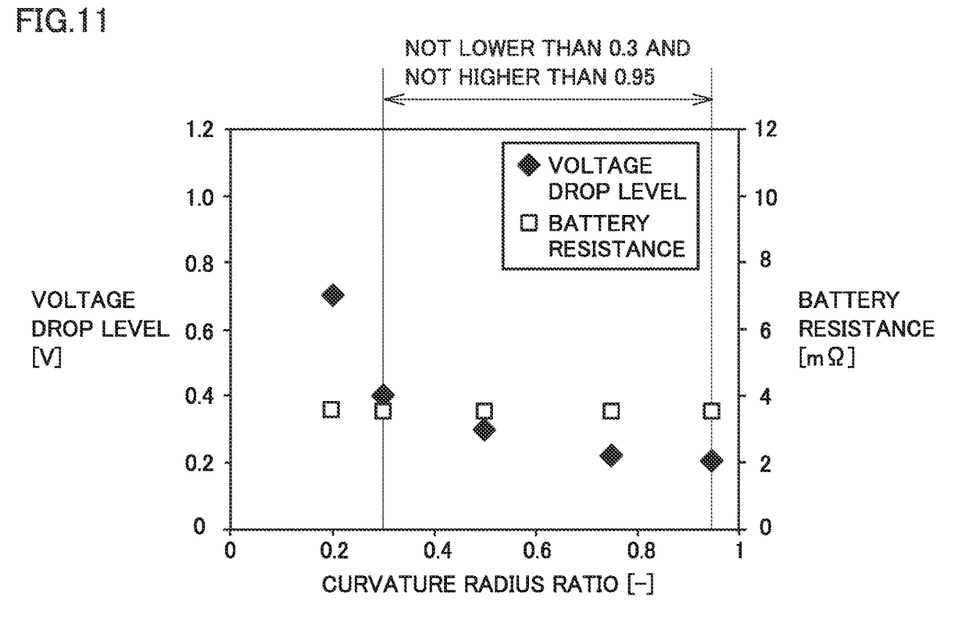
FIG. 11 is a graph showing the relationship between a curvature radius ratio and both of the level of voltage drop and the resistance of the battery.

FIG. 11 is a graph showing the relationship between a curvature radius ratio and both of the level of voltage drop and the resistance of the battery.

When the curvature radius ratio is within a range not lower than 0.3 and not higher than 0.95, the level of voltage drop tends to be markedly low. When the curvature radius ratio is not lower than 0.3 and not higher than 0.95, a change in the resistance of the battery tends to be small.

Figure 12:
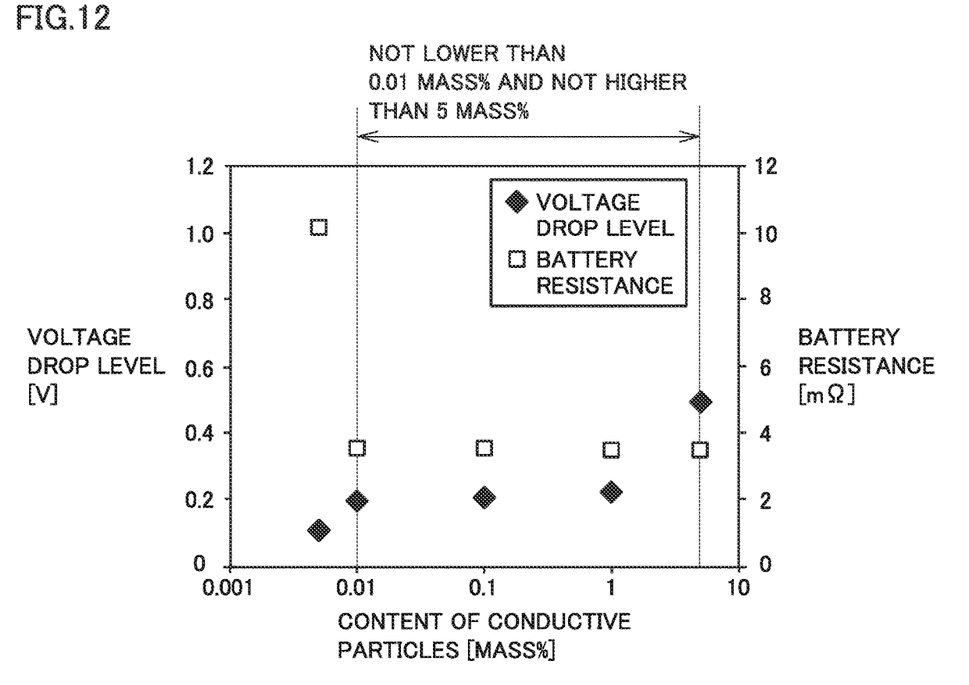
FIG. 12 is a single logarithmic graph showing the relationship between the content of conductive particles and both of the level of voltage drop and the resistance of the battery.

FIG. 12 is a single logarithmic graph showing the relationship between the content of the conductive particles and both of the level of voltage drop and the resistance of the battery. The abscissa is based on a logarithmic scale.

When the content of the conductive particles is within a range not lower than 0.01 mass % and not higher than 5 mass %, the resistance of the battery tends to be low.

Figure 13:
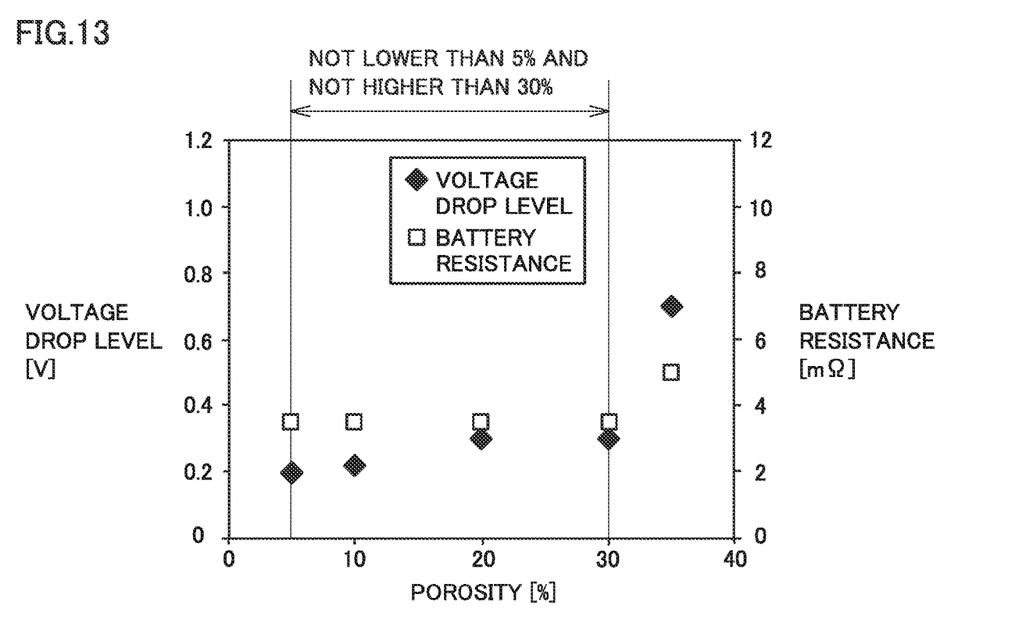
FIG. 13 is a graph showing the relationship between porosity and both of the level of voltage drop and the resistance of the battery.

FIG. 13 is a graph showing the relationship between the porosity and both of the level of voltage drop and the resistance of the battery.

When the porosity is within a range not lower than 5% and not higher than 30%, the resistance of the battery tends to be low. Also within this range, the level of voltage drop tends to be low. Within this range, the lower the porosity is, the lower the level of voltage drop tends to be.

Figure 14:
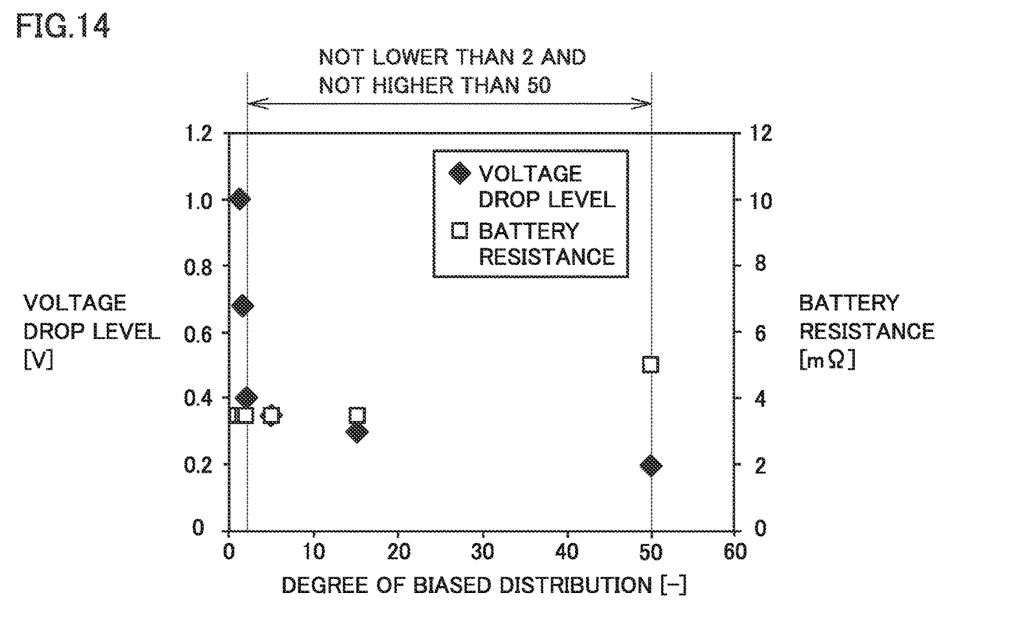
FIG. 14 is a graph showing the relationship between the degree of biased distribution and both of the level of voltage drop and the resistance of the battery.

FIG. 14 is a graph showing the relationship between the degree of biased distribution and both of the level of voltage drop and the resistance of the battery.

When the degree of biased distribution is within a range not lower than 2 and not higher than 50, the level of voltage drop tends to be markedly low. When the degree of biased distribution is within a range not lower than 2 and not higher than 50, the level of change in the resistance of the battery is within tolerable limits.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing a non-aqueous electrolyte secondary battery, the method comprising at least:
    forming an intermediate layer on a surface of an electrode current collector;
    forming an electrode composite material layer on a surface of the intermediate layer; and
    compressing the intermediate layer,
        the intermediate layer being formed so as to contain at least hollow ceramic particles and conductive particles, the conductive particles being at least one of:
        acetylene black particles,
        graphite particles,
        graphene particles,
        vapor grown carbon fiber, or
        carbon nanotubes,
        compression of the intermediate layer causing breakage of the hollow ceramic particles to form ceramic particles having an arc shape,
        within a cross section of the intermediate layer along a thickness direction, each ceramic particle has an arc shape.

2. A non-aqueous electrolyte secondary battery comprising at least:
    an electrode composite material layer;
    an intermediate layer; and
    an electrode current collector,
        the intermediate layer being interposed between the electrode composite material layer and the electrode current collector,
        the intermediate layer containing at least ceramic particles and conductive particles, the conductive particles being at least one of:
        acetylene black particles,
        graphite particles,
        graphene particles,
        vapor grown carbon fiber, or
        carbon nanotubes,
        within a cross section of the intermediate layer along a thickness direction,
            each ceramic particle having an arc shape, and
            more conductive particles being present on an outer-circumference side of each arc shape than on an inner-circumference side of the arc shape; wherein the non-aqueous electrolyte secondary battery is prepared by the method of claim 1.

3. The non-aqueous electrolyte secondary battery according to claim 2, wherein
    the arc shape comprises an outer-circumference line and an inner-circumference line,
    a region with a width of 1 μm extending from the outer-circumference line in a direction away from the inner-circumference line is defined as an outer-circumference region, a region with a width of 1 μm extending from the inner-circumference line in a direction away from the outer-circumference line is defined as an inner-circumference region,
    the conductive particles have a first concentration in the outer-circumference region, the conductive particles have a second concentration in the inner-circumference region, and
    a ratio of the first concentration to the second concentration is higher than 1.

4. The non-aqueous electrolyte secondary battery according to claim 3, wherein
    the ratio of the first concentration to the second concentration is not lower than 2 and not higher than 50.

5. The non-aqueous electrolyte secondary battery according to claim 3, wherein
    the outer-circumference line has a first radius of curvature, the inner-circumference line has a second radius of curvature, and
    a ratio of the second radius of curvature to the first radius of curvature is not lower than 0.3 and not higher than 0.95.

6. The non-aqueous electrolyte secondary battery according to claim 2, wherein
    the intermediate layer has a porosity not lower than 5% and not higher than 30%.

7. The non-aqueous electrolyte secondary battery according to claim 2, wherein
    the intermediate layer contains the conductive particles in an amount not lower than 0.01 mass % and not higher than 5 mass %.

* * * * *